US010352487B1

United States Patent
Stephens et al.

(10) Patent No.: US 10,352,487 B1
(45) Date of Patent: Jul. 16, 2019

(54) METHOD AND APPARATUS FOR INTERRUPTING ELECTRICAL CONDUCTIVITY THROUGH PIPELINES OR OTHER TUBULAR GOODS

(71) Applicant: R & B Innovations, LLC, Youngsville, LA (US)

(72) Inventors: Byron P. Stephens, Lafayette, LA (US); Robert L. Spikes, Lafayette, LA (US)

(73) Assignee: R & B Innovations, LLC, Youngsville, LA (US)

( * ) Notice: Subject to any disclaimer, the term of this patent is extended or adjusted under 35 U.S.C. 154(b) by 0 days.

(21) Appl. No.: 16/031,592

(22) Filed: Jul. 10, 2018

Related U.S. Application Data

(60) Provisional application No. 62/531,037, filed on Jul. 11, 2017.

(51) Int. Cl.
*F16L 25/02* (2006.01)

(52) U.S. Cl.
CPC ........... *F16L 25/023* (2013.01); *F16L 25/026* (2013.01); *Y10T 29/49826* (2015.01)

(58) Field of Classification Search
CPC ... F16L 25/023; F16L 25/025; F16L 19/0218; Y10T 29/49826
USPC ................................................... 285/52, 354
See application file for complete search history.

(56) References Cited

U.S. PATENT DOCUMENTS

| | | | |
|---|---|---|---|
| 299,206 A | 5/1884 | Deavs | |
| 497,251 A | 5/1893 | Peeples | |
| 2,867,463 A | 1/1959 | Snider | |
| 3,115,354 A * | 12/1963 | Bowan | F16L 25/023 285/52 |
| 3,185,501 A | 5/1965 | Bowan et al. | |
| 3,346,274 A * | 10/1967 | Baron | F16L 25/023 285/52 |
| 4,422,674 A | 12/1983 | Steuernagle | |
| 4,595,218 A | 6/1986 | Carr et al. | |
| 4,848,804 A * | 7/1989 | Weigl | F16L 25/023 285/52 |
| 5,088,773 A | 2/1992 | Gralenski | |
| 5,409,267 A | 4/1995 | Bagnulo | |
| 5,447,340 A | 9/1995 | Sands et al. | |
| 5,588,682 A | 12/1996 | Breese | |
| 6,267,414 B1 * | 7/2001 | Mosse | |
| 7,360,796 B2 | 4/2008 | Sutherland et al. | |
| 9,255,656 B2 | 2/2016 | Bernardi | |
| 2011/0084483 A1 * | 4/2011 | Nunez | |

* cited by examiner

*Primary Examiner* — Greg Binda
*Assistant Examiner* — Zachary T Dragicevich
(74) *Attorney, Agent, or Firm* — Ted M. Anthony

(57) ABSTRACT

An isolating flow line spool fitting, particularly for electrical isolation of above-ground steel flow lines or other pipes. Two opposing half segments are electrically separated from each other by non-conductive isolating materials. A first half segment includes a threaded male connection member, while a second half segment includes a mating threaded collar for threadedly connecting the second half segment to the first half segment, and thereby forming a fluid pressure seal.

14 Claims, 3 Drawing Sheets

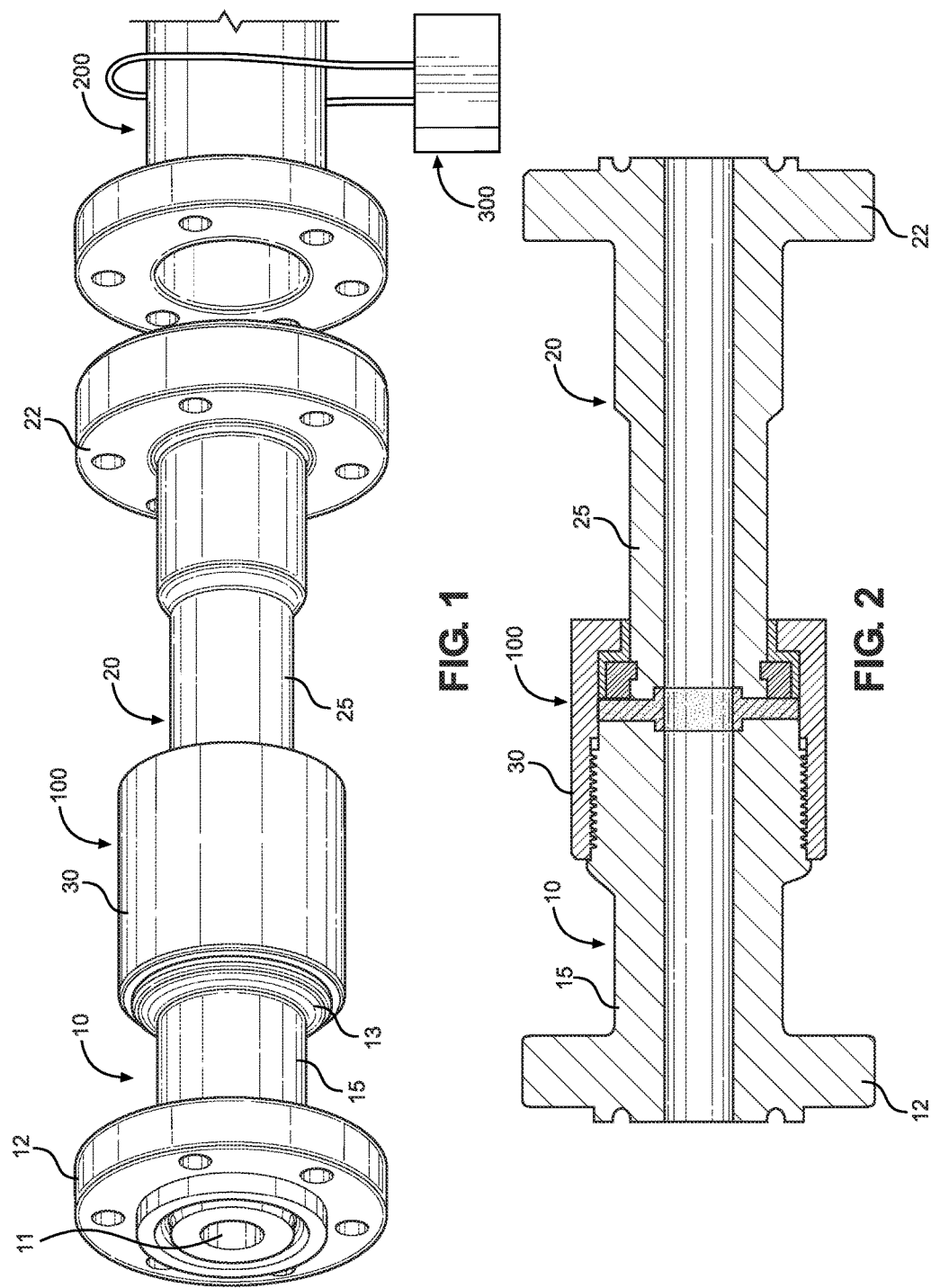

METHOD AND APPARATUS FOR INTERRUPTING ELECTRICAL CONDUCTIVITY THROUGH PIPELINES OR OTHER TUBULAR GOODS

FIELD OF THE INVENTION

The present invention pertains to a cathodic protection or other protection system for fluid flow conduits and other piping systems. More particularly, the present invention pertains to protection of fluid flow conduits including, without limitation, flow lines in the oil and gas industry holding fluids containing $CO_2/H_2S$ media/carbonic acid. More particularly still, the present invention pertains to a method and apparatus for preventing corrosion from $CO_2/H_2S$ (Carbon Dioxide/Hydrogen Sulfide) in oil and gas production flow lines and/or other pipelines.

BACKGROUND OF THE INVENTION

It is well known that fluid flow through piping or tubular goods can cause damage to such piping/tubular goods by corrosion, erosion and/or other forces. This phenomenon is very common throughout many different applications, but it is particularly common in the oil and gas industry. In such applications, iron in steel pipes and/or other conduits (such as flow lines and the like) will frequently corrode in the presence of corrosive materials that are by-products of hydrocarbon fluid production including, without limitation, oxygen, carbon dioxide and/or hydrogen sulfide.

Such corrosion, which is at least partially electrochemical in nature, can be enhanced or accelerated by the presence of aqueous fluid (such as, for example, produced water) that is frequently generated alongside hydrocarbons during the production of oil and/or natural gas. Further, many oil and gas production installations and related components (wellheads, flow lines, pipelines and the like) can have cathodic protection systems, wherein electrical current is applied to said components and one or more anodes are utilized. Said cathodic protection systems, which are well known to those having skill in the art, can also act to enhance or accelerate corrosion when aqueous fluid and/or carbonic acid is present.

Within such aqueous fluid(s), corroding agents such as carbon dioxide and hydrogen sulfide can lead to significant corrosion problems. Additionally, such carbon dioxide and hydrogen sulfide can often combine with water to form carbonic acid and dissolved hydrogen sulfide. The formation of such acids further increases the rate of corrosion of surrounding metal piping.

The negative consequences of such corrosion can be many and varied; the impact of such corrosion on the safe, reliable and efficient operation of fluid conduits and related systems can be more serious than the simple loss of metal mass or pipeline wall thickness. In many cases, significant negative consequences, often requiring expensive remedial efforts, may occur even though the amount of metal destroyed is relatively small. For example, reduction of metal thickness in a pressurized fluid conduit can lead to loss of mechanical strength and structural failure or breakdown.

In order to combat corrosion, it is frequently beneficial to interrupt electrical conductivity of metal conduits (such as surrounding pipelines, flow lines and/or other tubular goods) that contain and are in contact with such fluids and accompanying corrosive materials. One common method for interrupting such electrical conductivity is to install a non-conductive material at one or more locations along the length of said conduit to interrupt such continuous conductive material. However, conventional methods of attempting to interrupt such conductive material can be expensive, difficult to install and/or maintain, and frequently do not yield satisfactory results.

Thus, there is a need for an effective, inexpensive and user-friendly means for interrupting electrical conductivity of a fluid conduit. Such means for interrupting electrical conductivity should be easy to install and maintain, and should interrupt or break electrical conductivity at desired location(s) along the length of said fluid conduit.

SUMMARY OF THE PRESENT INVENTION

The present invention comprises an electrical conductivity interruption assembly for installation in fluid conduits such as, for example, above-ground flow lines, pipelines and the like. By way of illustration, but not limitation, said electrical conductivity interruption assembly comprises an isolating flow line spool fitting that can be beneficially used in applications where carbon dioxide ($CO_2$) and various other liquids (i.e. salt water or brine) can cause accelerated corrosion and/or other degradation of steel piping including, without limitation, from the effects of carbonic acid.

The isolating flow line spool fitting of the present invention can also be installed and utilized in steel pipe lines or flow lines where cathodic isolation is beneficial (i.e. water, waste water, oil and natural gas), or various other media that would benefit from such isolation. For example, the electrical conductivity interruption assembly of the present invention can also be used to prevent negative effects of static electricity or stray electrical currents (i.e. power lines or electrolysis of soils).

The present invention comprises two half-sections that can be quickly and efficiently installed within a metal flow line or other conduit. A non-conductive material interrupts electrical conductivity along the length of said flow line or conduit, such that metal elements of one half-section do not come in contact with, and are isolated from, metal components from a second half-section.

Said non-conductive material of said electrical conductivity interruption assembly of the present invention interrupts electrical conductivity and the flow of electricity along the length of said flow line or conduit. Accordingly, metal components of one half-section do not come in physical or electrical contact with metal from a second half-section; put another way, said metal sections are completely isolated from one another by such non-conductive material, thereby preventing the flow of electricity between said sections. Said electrical conductivity interruption assembly of the present invention further includes a fully open and/or unobstructed central through bore ("full bore") permitting flow of fluids through said electrical conductivity interruption assembly without restriction.

BRIEF DESCRIPTION OF DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

FIG. 1 depicts a side perspective view of the electrical conductivity interruption assembly of the present invention.

FIG. 2 depicts a sectional view of the electrical conductivity interruption assembly of the present invention.

DETAILED DESCRIPTION OF A PREFERRED EMBODIMENT

Figure 3:
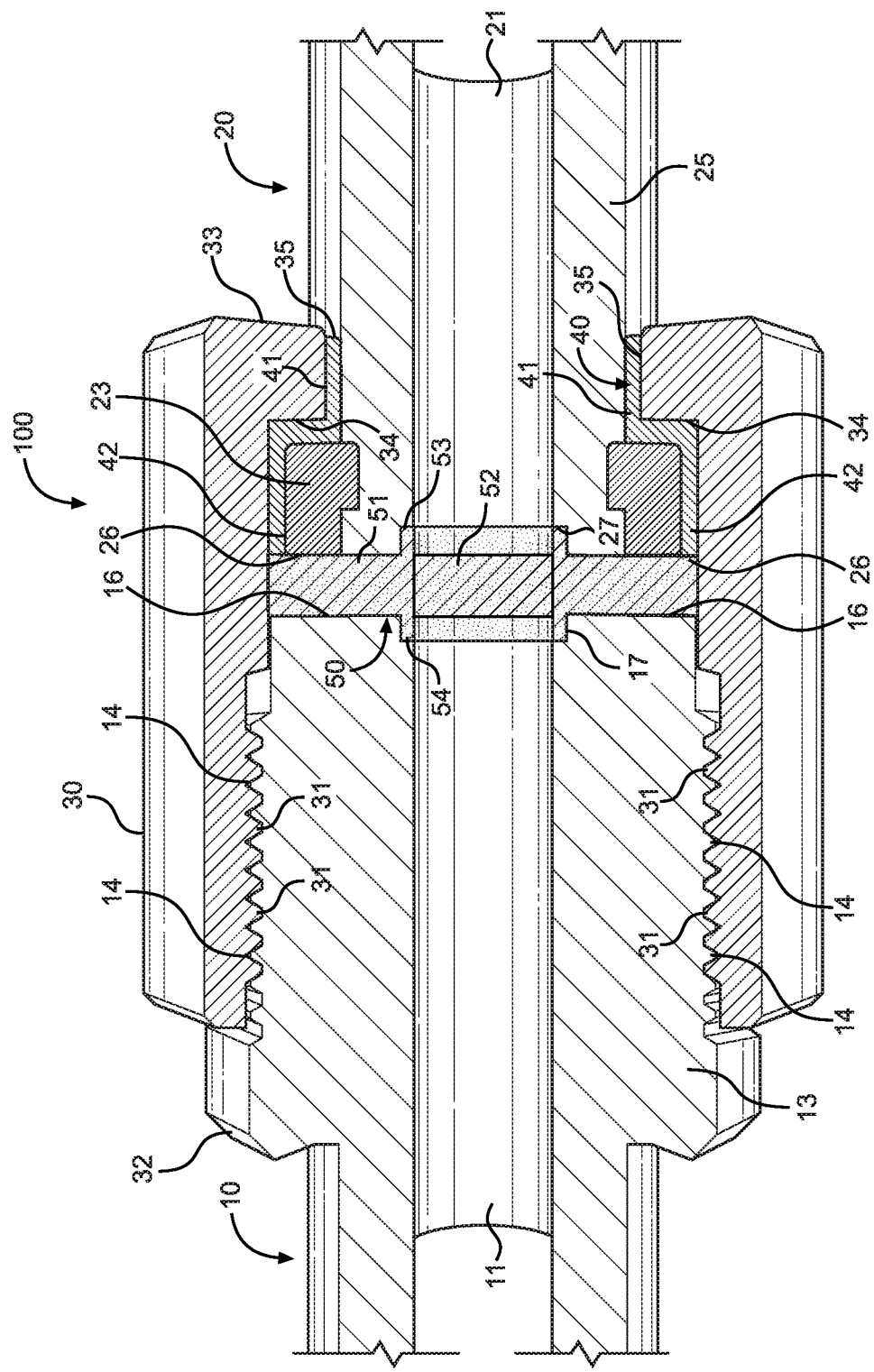
FIG. 3 depicts a detailed sectional view of the electrical conductivity interruption assembly of the present invention.

Referring to the drawings, FIG. 1 depicts a side perspective view of electrical conductivity interruption assembly 100 of the present invention. In a preferred embodiment, said electrical conductivity interruption assembly 100 of the present invention comprises a coupling or connection assembly that can be installed at one or more desired locations along the length of a tubular flow line or other pipeline. By way of illustration, but not limitation, said electrical conductivity interruption assembly 100 can be selectively installed within a length of flow line extending from an oil and/or gas well containing produced fluids (such as, for example, hydrocarbons and water produced from subterranean formations), as well as $CO_2$, $H_2S$ and/or carbonic acid.

Further, by way of illustration, but not limitation, said electrical conductivity interruption assembly 100 can be installed within a flow line 200 that is being cathodically protected, including instances wherein electrical current is applied to said flow line and/or related components such as wellheads and the like. In such instances, cathodic protection system 300 generally prevents corrosion by converting all anodic (active) sites on a metal surface to cathodic (passive) sites by supplying electrical current (or free electrons) from an alternate source. However, but for the benefits provided by the present invention, such applied electrical current can actually enhance and/or accelerate the negative corrosive effects at one or more locations along said flow line or pipeline 200.

In a preferred embodiment, said electrical conductivity interruption assembly 100 comprises first pipe segment 10 and second pipe segment 20, each having a central internal flow bore. Only central flow bore 11 of first pipe segment 10 is visible in FIG. 1. Said first pipe segment 10 comprises tubular body section 15 having a predetermined length. Conventional bolted flange member 12 (having bolt holes is spaced relationship) is disposed on one end of said tubular body section 15, while threaded head member 13 is disposed on the opposite end of said tubular body section 15. Similarly, said second pipe segment 20 comprises tubular body section 25 having a predetermined length. Conventional bolted flange member 22 (having bolt holes is spaced relationship) is disposed at one end of said tubular body section 25, while a nose member (not visible in FIG. 1) is disposed on the opposite end of said tubular body section 25.

A threaded collar member 30 is movably disposed relative to said second pipe segment 20. Said threaded collar member 30 has internal threads (not visible in FIG. 1), and can be threadedly connected to mating threaded head member 13 of first pipe segment 10; in this manner, said threaded collar member 30 can serve as a coupling member to selectively operationally attach said first pipe segment 10 to said second pipe segment 20.

As reflected in the embodiment depicted in FIG. 1, said first pipe segment 10 and second pipe segment 20 include conventional bolted flange members 12 and 22, respectively. Said flange member 12 can be joined with a mating conventional flange member disposed on a flow line or other conduit, while flange member 22 can also be joined with a mating conventional flange member disposed on said flow line or conduit. In this manner, said electrical conductivity interruption assembly 100 can be operationally installed at a desired location within a length of flow line or conduit, effectively bridging a gap formed between such opposing conventional flange members of a flow line or conduit. Notwithstanding the foregoing, it is to be observed that other means for installing electrical conductivity interruption assembly 100 within a length of flow line or conduit (besides conventional mating bolted flange members, such as flange members 12 and 22) can be envisioned without departing from the scope of the present invention.

FIG. 2 depicts a side sectional view of the electrical conductivity interruption assembly 100 of the present invention depicted in FIG. 1, while FIG. 3 depicts a detailed partial cut-away view of said electrical conductivity interruption assembly 100. Referring to FIG. 2, in a preferred embodiment, said electrical conductivity interruption assembly 100 comprises first pipe segment 10 and second pipe segment 20, operationally connected using threaded collar member 30.

Referring to FIG. 3, said first pipe segment 10 comprises tubular body section 15 having a predetermined length. In the view depicted in FIG. 3, said tubular body section 15 is truncated; although not depicted in FIG. 3, it is to be observed that a conventional flange member 12 (as shown in FIGS. 1 and 2) can be disposed on one end of said tubular body section 15. Threaded head member 13 having a larger outer diameter than tubular body section 15 is disposed at one end of said tubular body section 15. External threads 14 are disposed on the external surface of said threaded head member 13. A central through bore 11 extends through tubular body section 15 and threaded head member 13.

Still referring to FIG. 3, second pipe segment 20 comprises tubular body section 25 having a predetermined length. In the view depicted in FIG. 3, said tubular body section 25 is also truncated; although not depicted in FIG. 3, it is to be observed that a conventional flange member 22 (as shown in FIGS. 1 and 2) can be disposed on one end of said tubular body section 25. Nose member 23 having a larger outer diameter than tubular body section 25 is disposed at one end of said tubular body section 25. A central through bore 21 extends through tubular body section 25 and nose member 23.

A threaded collar member 30 has front end 32 and rear end 33. A bore 35 extends through said rear end 33; tubular body section 25 is received within said bore 35. As a result, said threaded collar member 30 is slidably disposed on said second pipe segment 20; however, internal shoulder 34 limits travel of said threaded collar member 30 in the direction of first pipe segment 10. Said threaded collar member 30 has internal threads 31 that are sized and configured to mate and engage with external threads 14 of threaded head member 13 of first pipe segment 10. Said threaded collar member 30 can serve as a coupling member to selectively operationally attach said first pipe segment 10 and said second pipe segment 20. Said threaded coupling 30 also defines a receptacle or housing for receiving nonconductive material to electrically isolate first pipe segment 10 from second pipe segment 20 as more fully discussed herein.

Figure 4:
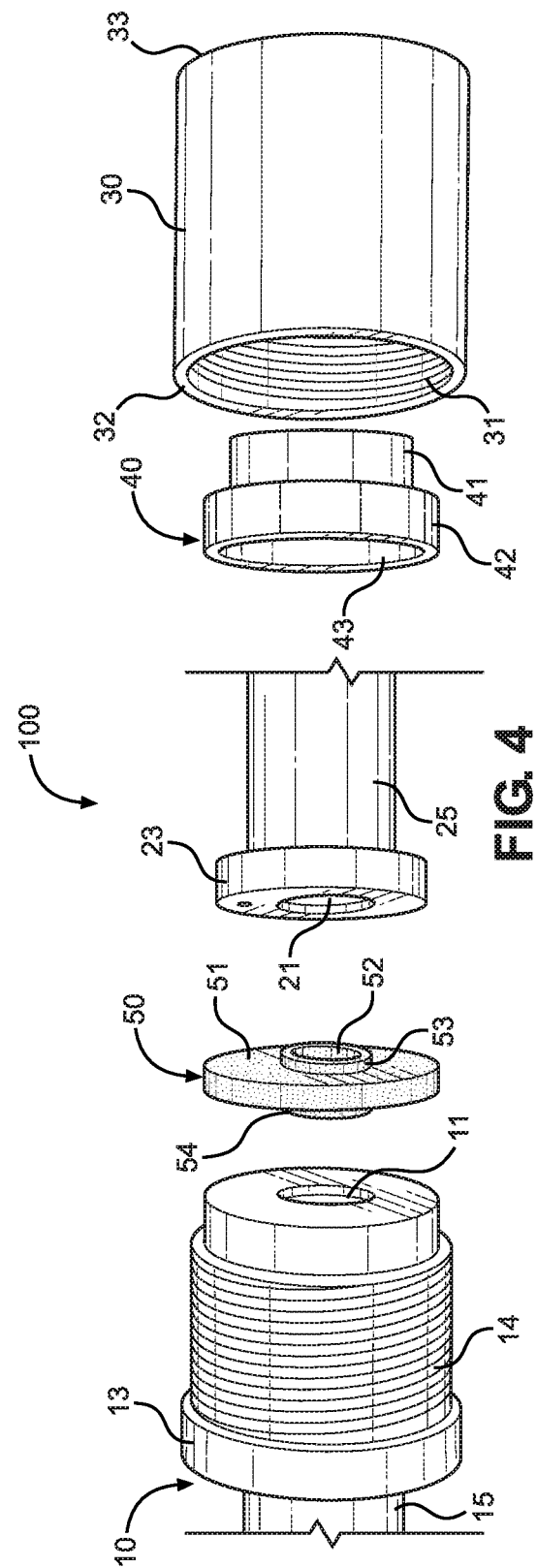
FIG. 4 depicts an exploded view of the electrical conductivity interruption assembly of the present invention.

FIG. 4 depicts an exploded view of electrical conductivity interruption assembly 100 of the present invention. First pipe segment 10 comprises tubular body section 15 having a predetermined length. In the view depicted in FIG. 4, said tubular body section 15 is truncated; however, it is to be observed that a conventional flange member 12 (as shown in FIGS. 1 and 2) can be disposed on one end of said tubular body section 15. Threaded head member 13 is disposed at an end of said tubular body section 15. External threads 14 are disposed on the external surface of said threaded head member 13. A central through bore 11 extends through tubular body section 15 and threaded head member 13.

Second pipe segment 20 comprises tubular body section 25 having a desired length. As depicted in FIG. 4, said tubular body section 25 is also truncated; although not depicted in FIG. 4, it is to be observed that a conventional flange member 22 (as shown in FIGS. 1 and 2) can be disposed on one end of said tubular body section 25. Nose member 23 having a larger outer diameter than tubular body section 25 is disposed at an end of said tubular body section 25 nearest first pipe segment 10. Central through bore 21 extends through tubular body section 25 and nose member 23.

A threaded collar member 30 has front end 32 and rear end 33. A bore 35 defining inner shoulder 34 (not visible in FIG. 4) extends through said rear end 33 of said threaded collar member 30. Said threaded collar member 30 has internal threads 31 that are sized and configured to mate with external threads 14 of threaded head member 13 of first pipe segment 10. Said threaded collar member 30 can serve as a coupling member to selectively operationally attach said first pipe segment 10 to said second pipe segment 20.

Insulation sleeve 40 has tubular body section 41, wider receptacle section 42 and central through bore 43. Said receptacle section 42 has a larger inner diameter than tubular body section 41, and is sized to receive nose member 23 of second pipe segment 20; in a preferred embodiment, body section 25 of second pipe segment 20 is configured to frictionally fit within the inner diameter of body section 41 of said insulation sleeve, while nose member 23 is configured to frictionally fit within the inner diameter of said receptacle section 42. In a preferred embodiment, said nose member 23 can comprise a multi-piece retaining ring that can be installed and secured on tubular body member 25 after threaded collar 30 and insulation sleeve 40 are installed on said body member 25; in this manner, the components of first pipe segment 10 and said second pipe segment 20, including any associated flanges, can be constructed using a forging process without requiring any welding of said components.

An insulation disk member 50 generally comprises a substantially circular disk having a planar body section 51 and central through bore 52. Ring-like rim member 53 extends from one side of said body section 51 and substantially encircles or surrounds said central through bore 52. Similarly, ring-like rim member 54 extends from an opposite side of said body section 51 from rim member 53, and also substantially encircles or surrounds said central through bore 52. Said insulation disk member 50 is generally disposed between threaded head member 13 of first pipe segment 10 and nose member 23 of second pipe segment 20.

In operation, electrical conductivity interruption assembly 100 can be operationally installed within a flow line or conduit using conventional bolted flange members as described above. Further, said electrical conductivity interruption assembly 100 can be selectively positioned at one or more desired locations along the length of said flow line or fluid conduit.

Referring to FIG. 3, a detailed sectional view of said electrical conductivity interruption assembly 100 is depicted in an assembled or "installed" configuration. As discussed above, tubular body sections 15 and 25 are shown as being truncated; however, it is to be observed that said tubular body sections 15 and 25 can be operationally attached to conventional flange members (as shown in FIGS. 1 and 2) for inclusion or installation within a flow line or other fluid conduit.

Threaded head member 13 has a larger outer diameter than tubular body section 15, as well as end surface 16. External threads 14 are disposed on the external surface of said threaded head member 13. Central through bore 11 extends through tubular body section 15 and threaded head member 13. In a preferred embodiment, said central through bore 11 also includes section of increased inner diameter 17 adjacent to said end surface 16.

Second pipe segment 20 has nose member 23, having a larger outer diameter than tubular body section 25, disposed at an end of said tubular body section 25. Said nose member 23 defines end surface 26, which is oriented in substantially opposing parallel relationship with end surface 16 of threaded head member 13. A central through bore 21 extends through tubular body section 25 and nose member 23. In a preferred embodiment, said central through bore 21 also includes section of increased inner diameter 27 adjacent to said end surface 26.

Threaded collar member 30 has front end 32 and rear end 33. Bore 35 extends through said rear end 32, defining inner shoulder 34. Said body section 25 of said second pipe segment 20 is received within said bore 35, while internal shoulder 34 limits travel of said threaded collar member 30 in the direction of first pipe segment 10. Internal threads 31 are sized and configured to mate with external threads 14 of threaded head member 13 of first pipe segment 10. In this manner, said threaded collar member 30 can serve as a coupling to selectively connect said first pipe segment 10 to said second pipe segment 20, thereby providing a mechanical attachment, as well as creation of a fluid pressure seal, between said components. Although not depicted in FIG. 3, a transverse "break off bolt" or other similar device well known to those having skill in the art can be installed to prevent said threaded collar member 30 from inadvertently unscrewing or "backing off" from threaded head member 13.

Said threaded coupling 30 also defines a receptacle or housing for receiving non-conductive material to electrically isolate first pipe segment 10 from second pipe segment 20. Insulation sleeve 40 has tubular body section 41, as well as a larger (wider) receptacle section 42. In a preferred embodiment, body section 25 of second pipe segment 20 is received within tubular body section 41 of insulation sleeve member 40, while said body section 41 is itself received within bore 35 of threaded coupling 30. Nose member 23 is received and frictionally fits within receptacle section 42 of said insulation sleeve. It is to be observed that non-conductive sleeve member 40 is interposed between threaded coupling 30 and second pipe segment 20, thereby preventing physical contact between said threaded coupling 30 and second pipe segment 20, and electrically isolating said threaded coupling 30 and second pipe segment 20.

Insulation disk member 50 generally comprises a substantially circular disk having a planar body section 51 and central through bore 52. Ring-like rim member 53 extends from one side of said body section 51 and substantially encircles or surrounds said central through bore 52, while ring-like rim member 54 extends from the opposite side of said body section 51 and also substantially encircles or surrounds said central through bore 52. Said insulation disk member 50 is disposed between end surface 16 of threaded head member 13 of first pipe segment 10, and end surface 26 of nose member 23 of second pipe segment 20.

In a preferred embodiment, ring-like rim member 54 is received within section of increased inner diameter 17 of central through bore 11 adjacent to said end surface 16 of first pipe segment 10. Similarly, ring-like rim member 53 is received within section of increased inner diameter 27 of central through bore 21 adjacent to said end surface 26 of second pipe segment 20. It is to be observed that non-conductive insulation disk 50 is interposed between first pipe segment 10 and second pipe segment 20, thereby preventing physical contact between said pipe segments (including, without limitation, end surfaces 16 and 26 thereof), and electrically isolating said first pipe segment 10 and second pipe segment 20.

In a preferred embodiment, said disk member 50 can be constructed of polyether ether ketone ("PEEK"), while insulation sleeve member 40 can be constructed of a glass-filled polymer such as, for example, a high strength, woven glass epoxy laminate such as "NEMA G-11". However, it is also to be observed that other materials having desired characteristics (including, without limitation, strength, durability and electrical non-conductivity) can be utilized without departing from the scope of the present invention. Further, one or more components of the present invention can be treated with a corrosion resistant/non-conductive coating; by way of illustration, but not limitation, such corrosion resistant/non-conductive coating can comprise multi-process fluoropolymer coating marketed by S & J TECHNOLOGIES, LLC under the brand name "ZPEX."

Said non-conductive material of said electrical conductivity interruption assembly 100 of the present invention interrupts electrical conductivity along the length of said flow line or conduit, such that metal components of one half section do not come in physical or electrical contact with metal from a second half-section; put another way, said metal sections are completely isolated from one another by such non-conductive material, thereby preventing the flow of electricity between said sections. Said electrical conductivity interruption assembly 100 of the present invention further includes a fully open and/or unobstructed central through bore ("full bore") permitting flow of fluids through said electrical conductivity interruption assembly 100 without restriction.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An apparatus for interrupting the electrical conductivity of a flow line containing fluid from an oil or gas well comprising:
   a) a first tubular member having a first end, a second end, a central bore and a first flange member disposed at said first end, wherein said first flange member is forged and not welded to said first tubular member, and configured for attachment to a mating flange of said flow line;
   b) a second tubular member having a first end, a second end, a central bore and a second flange member disposed at said first end of said second tubular member, wherein said second flange member is forged and not welded to said second tubular member, and configured for operational attachment to a mating flange of said flow line;
   c) a connection assembly for selectively attaching said first tubular member to said second tubular member comprising:
      i) a male threaded connection on said second end of said first tubular member; and
      ii) a coupling member rotatably disposed on said second end of said second tubular member, wherein said coupling member has a female threaded connection configured to mate with said male threaded connection;
   d) a multi-part nose member disposed around said second end of said second tubular member, wherein said nose member has a larger outer diameter than said second tubular member;
   e) a seal disk disposed between said first and second tubular members, wherein said seal disk further comprises a first side, a second side, a central aperture, a first extension encircling said central aperture on said first side configured to be received within said central bore of said first tubular member, and a second extension encircling said central aperture on said second side configured to be received within said central bore of said second tubular member; and
   f) an isolation sleeve disposed within said coupling member, wherein said seal disk and isolation sleeve are constructed of non-conductive material and are configured to interrupt the flow of electricity between said first and second tubular members.

2. The apparatus of claim 1, wherein a corrosion resistant or non-conductive coating is applied to all surfaces of said first tubular member, said second tubular member, and said connection assembly.

3. The apparatus of claim 2, wherein said corrosion resistant or non-conductive coating comprises multi-process fluoropolymer material.

4. The apparatus of claim 3, wherein said seal disk comprises polyether ether ketone.

5. The apparatus of claim 4, wherein said isolation sleeve comprises a glass-filled polymer.

6. The apparatus of claim 1, wherein said fluid contains carbonic acid.

7. The apparatus of claim 1, wherein said flow line is equipped with a cathodic protection system wherein electric current is applied to said flow line.

8. A method for preventing corrosion in a flow line containing fluid from an oil or gas well containing water and carbon dioxide comprising:
   a) installing an electrical conductivity interruption apparatus in said flow line, wherein said apparatus comprises:
      i) a first tubular member having a first end, a second end, a central bore, a male threaded connection at said second end, and a first flange member disposed at said first end, wherein said first flange member is forged and not welded to said first tubular member, and configured for attachment to a mating flange of said flow line;
      ii) a second tubular member having a first end, a second end, a central bore and a second flange member disposed at said first end of said second tubular member, wherein said second flange member is forged and not welded to said second tubular member, and configured for operational attachment to a mating flange of said flow line;

iii) a coupling member rotatably disposed on said second tubular member, wherein said coupling member has a female threaded connection configured to mate with said male threaded connection of said first tubular member for selectively attaching said first tubular member to said second tubular member;

iv) a multi-part nose member disposed around said second end of said second tubular member, wherein said nose member has a larger outer diameter than said second tubular member;

v) a seal disk disposed between said first and second tubular members, wherein said seal disk further comprises a first side, a second side, a central aperture, a first extension encircling said central aperture on said first side configured to be received within said central bore of said first tubular member, and a second extension encircling said central aperture on said second side configured to be received within said central bore of said second tubular member;

vi) an isolation sleeve disposed within said coupling member, wherein said seal disk and isolation sleeve are constructed of non-conductive material and are configured to interrupt the flow of electricity between said first and second tubular members; and b) interrupting the flow of electricity through said flow line.

9. The method of claim 8, wherein said seal disk comprises polyether ether ketone.

10. The method of claim 8, wherein said isolation sleeve comprises a glass-filled polymer.

11. The method of claim 8, wherein a corrosion resistant or non-conductive coating is applied to all surfaces of said first tubular member, said second tubular member, and said coupling member.

12. The method of claim 11, wherein said corrosion resistant or non-conductive coating comprises multi-process fluoropolymer material.

13. The method of claim 8, wherein electric current is applied to said flow line to cathodically protect said flow line.

14. The method of claim 8, wherein said fluid contains carbonic acid.

* * * * *